United States Patent
Lu et al.

(10) Patent No.: US 9,246,164 B2
(45) Date of Patent: Jan. 26, 2016

(54) PROTECTED TRANSITION METAL HEXACYANOFERRATE BATTERY ELECTRODE

(71) Applicant: Sharp Laboratories of America, Inc., Camas, WA (US)

(72) Inventors: Yuhao Lu, Vancouver, WA (US); Jong-Jan Lee, Camas, WA (US); David Evans, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 283 days.

(21) Appl. No.: 13/872,673

(22) Filed: Apr. 29, 2013

(65) Prior Publication Data
US 2013/0260260 A1    Oct. 3, 2013

Related U.S. Application Data

(63) Continuation-in-part of application No. 13/752,930, filed on Jan. 29, 2013, now Pat. No. 9,099,718, which is a continuation-in-part of application No. 13/603,322, filed on Sep. 4, 2012, now Pat. No.
(Continued)

(51) Int. Cl.
*H01M 4/136* (2010.01)
*H01M 4/36* (2006.01)
(Continued)

(52) U.S. Cl.
CPC ............. *H01M 4/136* (2013.01); *H01M 4/366* (2013.01); *H01M 4/58* (2013.01); *H01M 4/1397* (2013.01);
(Continued)

(58) Field of Classification Search
CPC .... H01M 4/136; H01M 4/1397; H01M 4/366
USPC .................................................. 429/324, 211
See application file for complete search history.

(56) References Cited

U.S. PATENT DOCUMENTS 5,472,807 A     12/1995 Licht et al.
2012/0295169 A1  11/2012 Hosoe et al.
(Continued)

FOREIGN PATENT DOCUMENTS

JP    10-021898    1/1998
JP    2008041502   2/2008
(Continued)

OTHER PUBLICATIONS

V.D. Neff, Some performance characteristics of a Prussian Blue battery, Journal of Electrochemical Society, 132 (1985) 1382-1384.
(Continued)

*Primary Examiner* — Mark F Huff
*Assistant Examiner* — Monique Wills
(74) *Attorney, Agent, or Firm* — Law Office of Gerald Maliszewski; Gerald Maliszewski

(57) ABSTRACT

A protected transition metal hexacyanoferrate (TMHCF) battery cathode is presented, made from $A_xM_yFe_z(CN)_n \cdot mH_2O$ particles, where the A cations are either alkali or alkaline-earth cations, and M is a transition metal. In one aspect the cathode passivation layer may be materials such as oxides, simple salts, carbonaceous materials, or polymers that form a film overlying the $A_xM_yFe_z(CN)_n \cdot mH_2O$ particles. In another aspect, the cathode passivation layer is a material such as oxygen, nitrogen, sulfur, fluorine, chlorine, or iodine that interacts with the $A_xM_yFe_z(CN)_n \cdot mH_2O$ particles, to cure defects in the $A_xM_yFe_z(CN)_n \cdot mH_2O$ crystal lattice structure. Also presented are TMHCF battery synthesis methods.

11 Claims, 7 Drawing Sheets

Related U.S. Application Data 9,159,502, which is a continuation-in-part of application No. 13/523,694, filed on Jun. 14, 2012, now Pat. No. 8,956,760, which is a continuation-in-part of application No. 13/449,195, filed on Apr. 17, 2012, which is a continuation-in-part of application No. 13/432,993, filed on Mar. 28, 2012, application No. 13/872,673, which is a continuation-in-part of application No. 13/793,559, filed on Mar. 11, 2013, now abandoned.

(51) Int. Cl.

| | | |
|---|---|---|
| *H01M 4/58* | (2010.01) | |
| *H01M 4/1397* | (2010.01) | |
| *H01M 10/052* | (2010.01) | |
| *H01M 10/054* | (2010.01) | |
| *H01M 4/02* | (2006.01) | |

(52) U.S. Cl.
CPC ............. *H01M 4/582* (2013.01); *H01M 10/052* (2013.01); *H01M 10/054* (2013.01); *H01M 2004/028* (2013.01); *Y02E 60/122* (2013.01)

(56) References Cited

U.S. PATENT DOCUMENTS

| | | | | |
|---|---|---|---|---|
| 2012/0328936 A1* | 12/2012 | Wessells et al. | ............. | 429/188 |
| 2013/0177808 A1* | 7/2013 | Wang et al. | .................. | 429/219 |

FOREIGN PATENT DOCUMENTS

| | | |
|---|---|---|
| JP | 2011-180469 | 9/2011 |
| JP | 2011180469 | 9/2011 |
| JP | 2011-246303 | 12/2011 |
| JP | 2011246303 | 12/2011 |
| JP | 2012022969 | 2/2012 |
| JP | 2012046399 | 3/2012 |

OTHER PUBLICATIONS

N. IManishi, et al., Lithium intercalation behavior into iron cyanide complex as positive electrode of lithium secondary battery, Journal of Power Sources, 79 (1999) 215-219.

Y. Lu, L. Wang, J. Cheng, J.B. Goodenough, Prussian blue: a new framework for sodium batteries, Chemistry Communication, 48(2012)6544-6546.

L. Wang, Y. Lu, J. Liu, M. Xu, J. Cheng, D. Zhang, J.B. Goodenough, A superior low-cost cathode for a Na-ion battery, Angew, Chem, Int. Ed., 52(2013)1964-1967.

A. Eftekhari, Potassium secondary cell based on Prussian blue cathode, J. Power Sources, 126(2004) 221-228.

C.D. Wessells, R.A. Huggins, Y, Cui, Copper hexacyanoferrate battery electrodes with long cycle life and high power, Nature Communication, 2(2011)550.

C.D. Wessells et al., Nickel hexacyanoferrate nanoparticle electrodes for aqueous sodium and potassium ion batteries. Nano Lettetter, 11(2011)5421-5425.

C.D. Wessells et al., The effect of insertion species on nanostructured open framework hexacyanoferrate battery electrode, J. Electrochem. Soc., 159(2012)A98-A103.

T.Matsuda, M. Takachi, Y. Moritomo, A sodium manganese ferrocyanide thin film for Na-ion batteries, Chemical Communicatoins, DOI: 10.1039/C3CC38839E.

S.-H. Yu et al., Iron hexacyanoferrate nanoparticles as cathode materials for lithium and sodium rechargeable batteries, ECS Electrochemistry Letters, 2(2013)A39-A41.

D. Asakura et al., Bimetallic cyanide-bridged coordination polymers as lithium ion cathode materials: core @shell nanoparticles . . . , J. Am. Chem. Soc., 135(2013)2793-2799.

M. Okubo et al., Ion-induced transformation of magnetism in a bimetallic CuFe Prussian blue analogue, Angew, Chem, Int. Ed., 50(2011)6269-6273.

H.J. Buser, D. Schwarzenbach, W. Petter, A. Ludi, the crystal structure of Prussian blue: $Fe_4[Fe(CN)_6]_3$ xH=O, Inorganic Chemistry, 16(1977) 2704-2710.

F. Herren et al., Neutron diffraction study of Prussian blue, $Fe_4[Fe(CN)_6]_3xH_2O$. Location of water molecules and long-range magnetic order, Inorg. Chem 1980, 19, 956-959.

K.-S. Park et al., Enhanced charge-transfer kinetics by anion surfcae modification of $LiFePO_4$, Chem. Mater, 24(2012)3212-3218.

Asakura et al., "Bimetallic Cyanide-Bridged Coordination Polymers as Lithium Ion Cathode Materials . . .", J Am Chem Soc, 2013, 135, 2793-2799.

\* cited by examiner

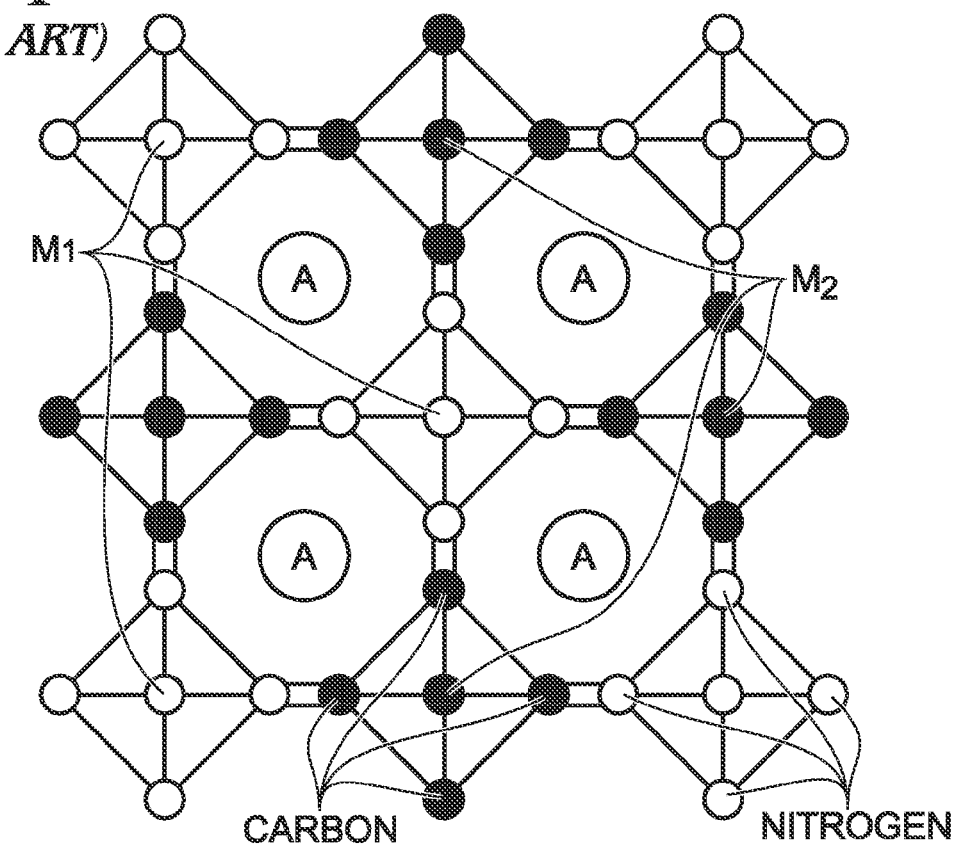

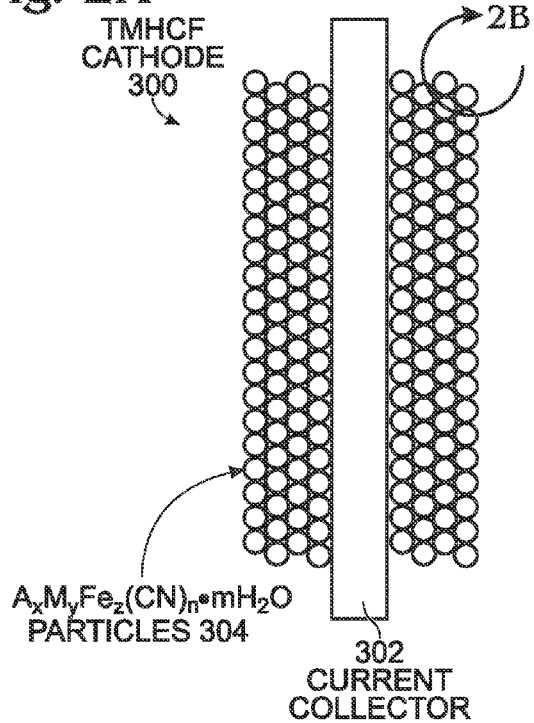
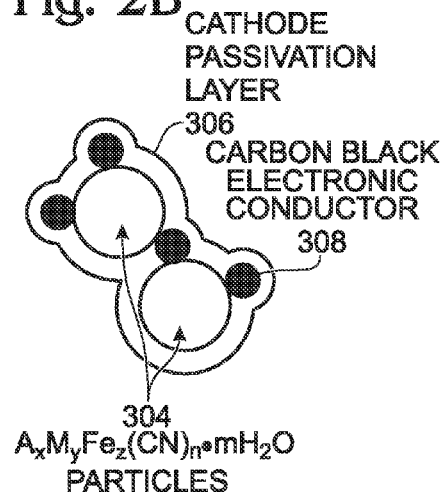
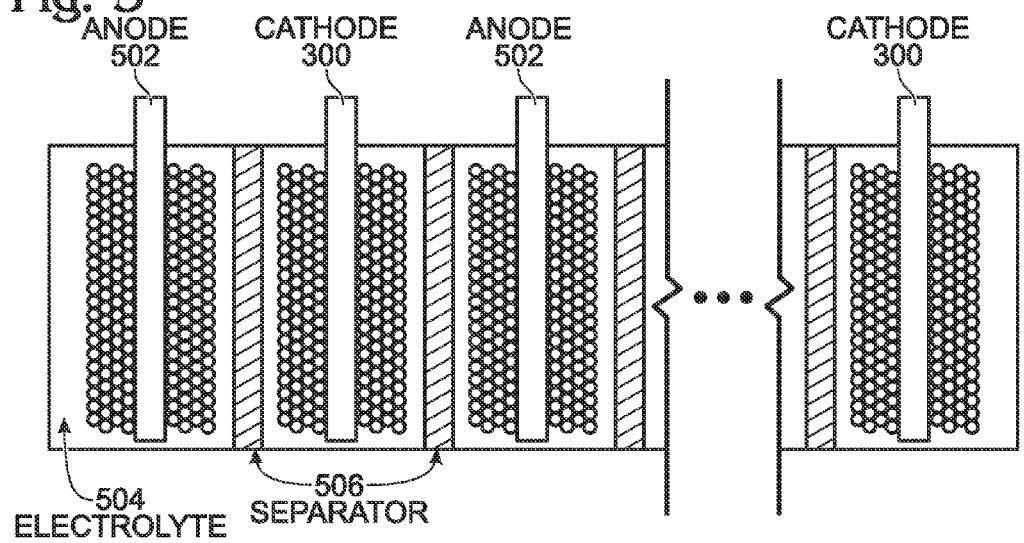

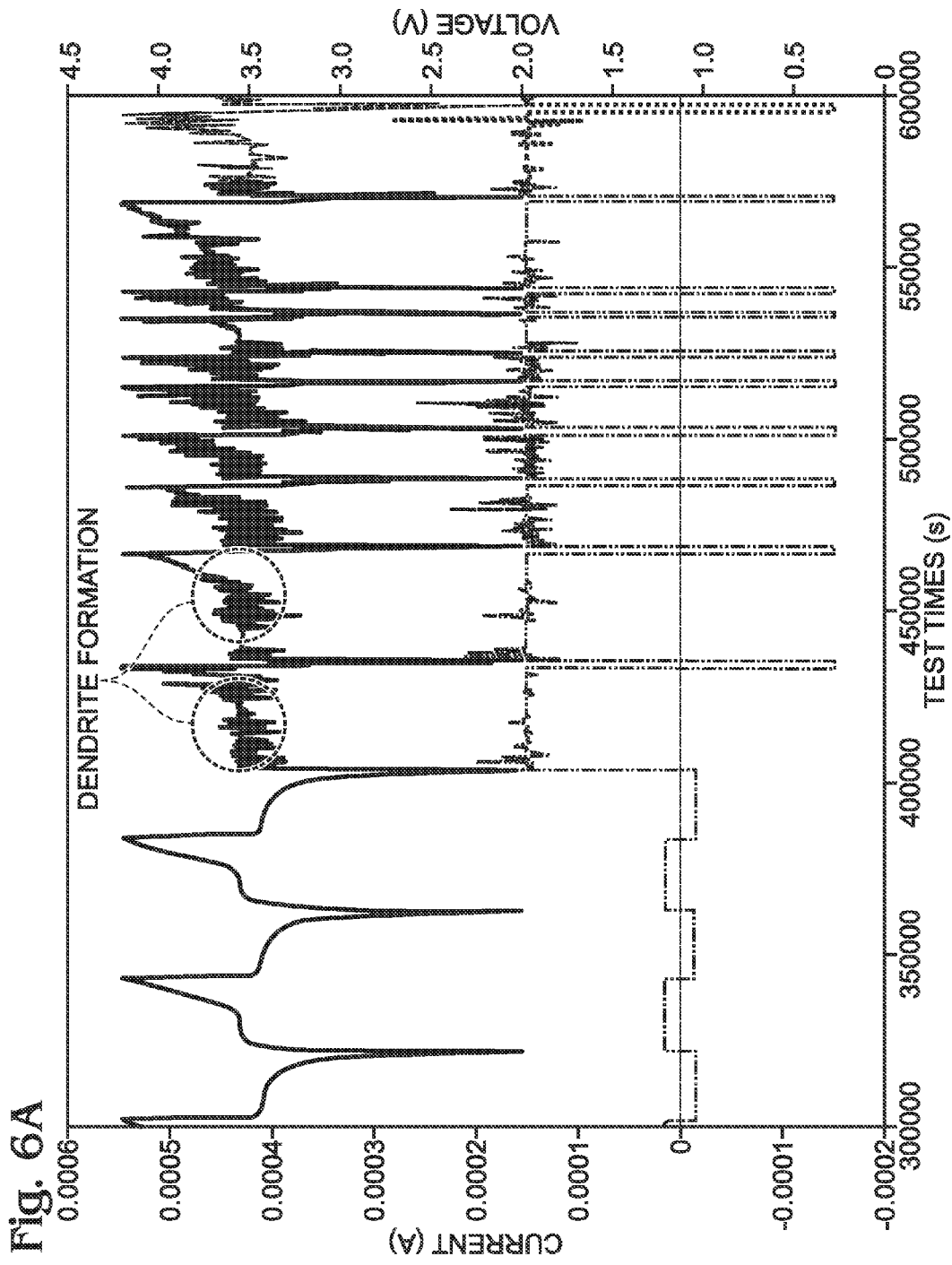

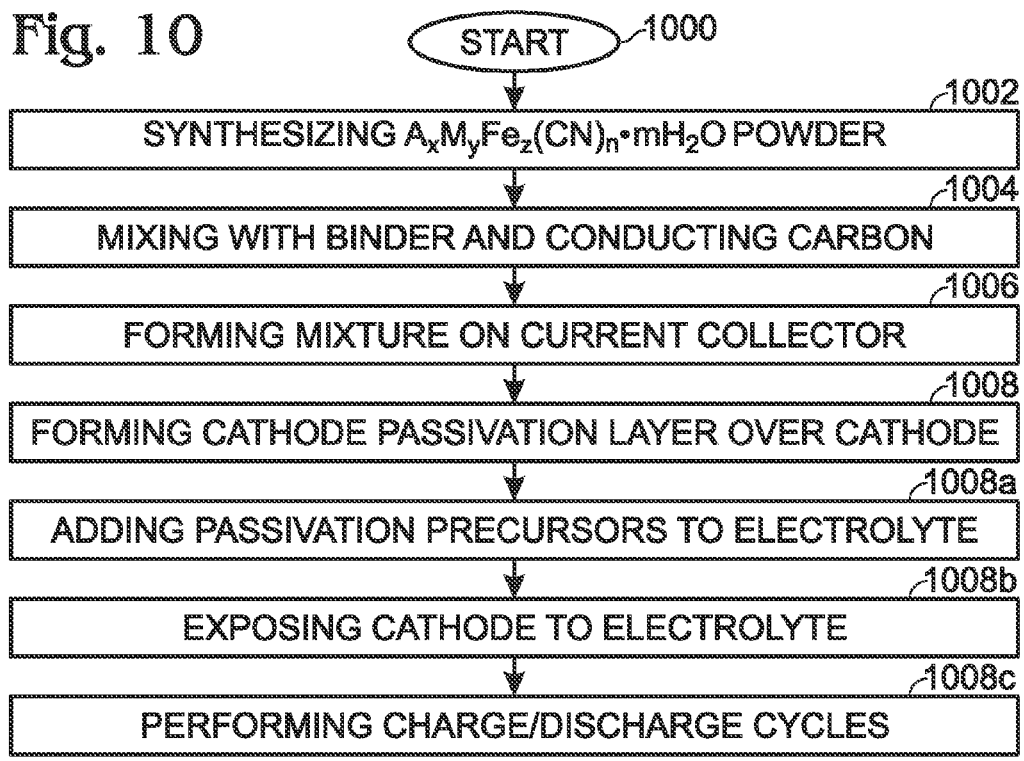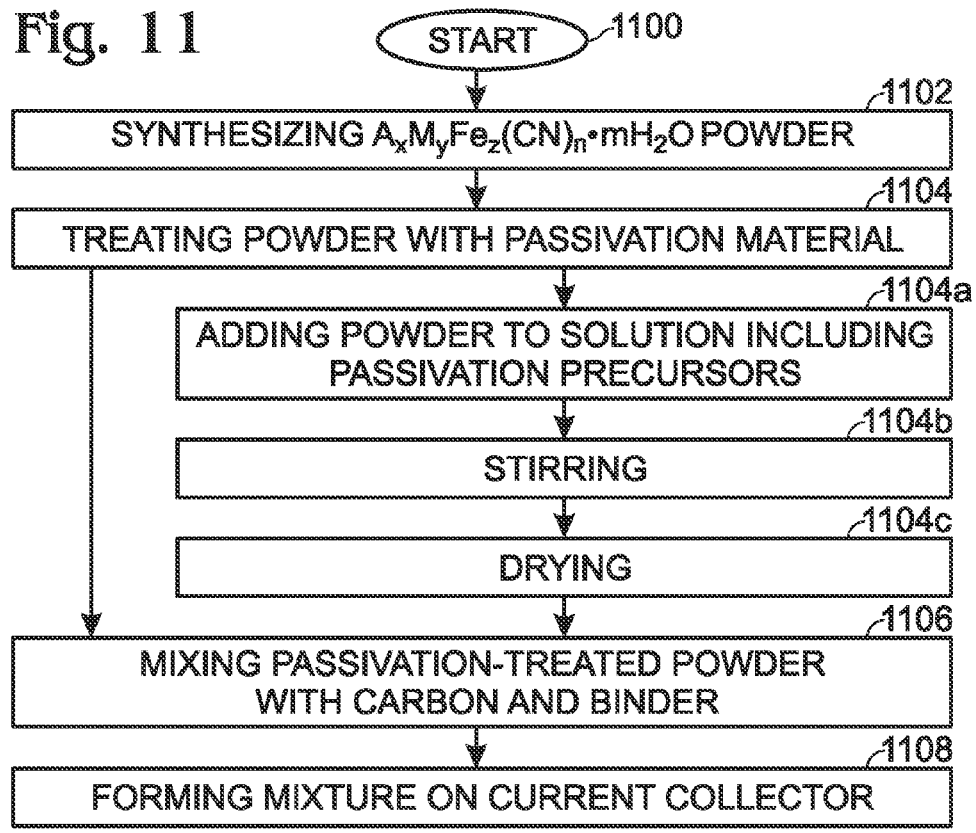

PROTECTED TRANSITION METAL HEXACYANOFERRATE BATTERY ELECTRODE

RELATED APPLICATIONS

This application is a Continuation-in-Part of an application entitled, TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013;

which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012, Ser. No. 13/752,930 is also a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012;

which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012;

which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012.

This application is a Continuation-in-part of an application entitled, CARBON-SULFUR COMPOSITE CATHODE PASSIVATION AND METHOD FOR. MAKING SAME, invented by Jong-Jan Lee, Ser. No. 13/793,559, filed Mar. 11, 2013. All these applications are incorporated herein by reference.

BACKGROUND OF THE INVENTION

1. Field of the Invention

This invention generally relates to electrochemical cells and, more particularly, to a protected transition-metal hexacyanoferrate (TMHCF) cathode battery and associated fabrication processes.

2. Description of the Related Art

A battery is an electrochemical cell through which chemical energy and electric energy can be converted back and forth. The energy density of a battery is determined by its voltage and charge capacity. Lithium has the most negative potential of −3.04 V vs. $H_2H^+$, and has the highest gravimetric capacity of 3860 milliamp-hours per gram (mAh/g). Due to their high energy densities, lithium-ion batteries have led the portable electronics revolution. However, the high cost of lithium metal renders doubtful the commercialization of lithium batteries as large scale energy storage devices. Further, the demand for lithium and its reserve as a mineral have raised the need to build other types metal-ion batteries as an alternative.

Lithium-ion (Li-ion) batteries employ lithium storage compounds as the positive (cathode) and negative (anode) electrode materials. As a battery is cycled, lithium ions ($Li^+$) are exchanged between the positive and negative electrodes. Li-ion batteries have been referred to as rocking chair batteries because the lithium ions "rock" back and forth between the positive and negative electrodes as the cells are charged and discharged. The positive electrode (cathode) material is typically a metal oxide with a layered structure, such as lithium cobalt oxide ($LiCoO_2$), or a material having a tunneled structure, such as lithium manganese oxide ($LiMn_2O_4$), on an aluminum current collector. The negative electrode (anode) material is typically a graphitic carbon, also a layered material, on a copper current collector. In the charge-discharge process, lithium ions are inserted into, or extracted from interstitial spaces of the active materials.

Similar to the lithium-ion batteries, metal-ion batteries use the metal-ion host compounds as their electrode materials in which metal-ions can move easily and reversibly. As for a $Li^+$-ion, it has one of the smallest radii of all metal ions and is compatible with the interstitial spaces of many materials, such as the layered $LiCoO_2$, olivine-structured $LiFePO_4$, spinel-structured $LiMn_2O_4$, and so on. Other metal ions, such as $Na^+$, $K^+$, $Mg^{2+}$, $Al^{3+}$, $Zn^{2+}$, etc., with large sizes, severely distort Li-based intercalation compounds and ruin their structures in several charge/discharge cycles. Therefore, new materials with large interstitial spaces would have to be used to host such metal-ions in a metal-ion battery.

FIG. 1 is a diagram depicting the crystal structure of a transition-metal hexacyanoferrate (TMHCF) in the form of $A_xM1M2(CN)_6$ (prior art). TMHCFs with large interstitial spaces have been investigated as cathode materials for rechargeable lithium-ion batteries [1,2], sodium-ion batteries [3,4], and potassium-ion batteries [5]. With an aqueous electrolyte containing the proper alkali-ions or ammonium-ions, copper and nickel hexacyanoferrates ((Cu,Ni)—HCFs) exhibited a very good cycling life that 83% capacity was retained after 40,000 cycles at a charge/discharge current of 17C [6-8]. However, the materials demonstrated low capacities and energy densities because: (1) just one sodium-ion can be inserted/extracted into/from each Cu—HCF or Ni—HCF molecule, and (2) these TMHCFs electrodes must be operated below 1.23 V due to the water electrochemical window. To correct these shortcomings, manganese hexacyanoferrate (Mn—HCF) and iron hexacyanoferrate (Fe—HCF) were used as cathode materials in non-aqueous electrolyte [9, 10]. Assembled with a sodium-metal anode, the Mn—HCF and Fe—HCF electrodes cycled between 2.0V and 4.2 V and delivered capacities of about 110 mAh/g.

However, some TMHCFs electrodes with high capacities exhibited rapid capacity degradation with cycling, when they were used in rechargeable batteries with non-aqueous electrolyte. For example, the capacity of Fe—HCF electrodes in lithium-ion batteries decreased from 110 mAh/g to 80 mAh/g after 10 cycles [2]. A Cu—HCF electrode with $Li^+$-ion electrolyte delivered 120 mAh/g during the first discharge, but its capacity decreased to 40 mAh/g after 10 cycles [11]. On one hand, the capacity fading can be attributed to many factors related to the Millais themselves, such as their phase changes during charge/discharge, interstitial water, and metal-ions dissolution from TMHCFs to the electrolyte. On the other hand, the interaction between TMHCFs electrodes and electrolytes also affect their performance. The side reactions of electrolytes on the surfaces of Cu—HCFs electrodes induced the redox-inactive Fe(II) ions and affected their electronic structures [12]. To improve the cycling life of Cu—HCFs, a core (Cu—HCF)-shell (Ni—HCF) electrode materials was prepared and evaluated in Li-ion batteries [12]. After 50 cycles the core-shell electrode had about 65% capacity left, which was much better than Cu—HCF electrode (about 20% capacity retention).

It is worth noting that the actual capacities of TMHCFs electrodes are far smaller than their theoretical values. For instance, the theoretical capacity for Mn—HCF is 170 mAh/ g, but the capacity was just reported ~120 mAh/g, as it was tested in a sodium-ion battery. It was believed that structures of TMHCFs determined their performance. Buser et al. [13] investigated the crystal structure of Prussian blue (PB) $Fe_4[Fe(CN)_6]_3 \cdot xH_2O$ and found that the $Fe(CN)_6$ positions were only partly occupied. The vacancies led to much water entering the PB interstitial space and even associating with Fe(III) in the lattice [14]. In consideration of charge neutralization and interstitial space, the vacancies and water reduced the concentration of mobile ions in the interstitial space of TMHCFs. As an example, Matsuda, et al. [9] preferred to use $A_{4x-2}M_A[M_B(CN)_6]_x \cdot zH_2O$ to replace the nominal formula, $A_2M_AM_B(CN)_6$ because of the vacancies. Furthermore, the vacancies result in dense defects on the surface of TMHCFs. Without interstitial ions and water support, the surface easily collapses. The surface degradation can be aggravated when the interstitial ions near the surface are extracted out during electrochemical reactions. In a battery, this degradation leads to a poor capacity retention. As noted above, a Cu—HCF electrode with $Li^+$-ion electrolyte delivered 120 mAh/g during the first discharge, but its capacity decreased to 40 mAh/g after 10 cycles [11]. By coating with Ni—HCF, the surface of Cu—HCF was modified and its stability was improved. However, undercoordinated transition metals (UTM) on the surface retarded charge transfer between the TMHCF electrode and the electrolyte due to electric repulsion between UTM and mobile ions, resulting in poor electrochemical performance. Park et al. [15] noted that the surface effect on a $LiFePO_4$ electrode, with undercoordinated $Fe^{2+}/Fe^{3+}$ at the surface, created a barrier for $Li^+$ transport across the electrolyte/electrode interface.

[1] V. D. Neff, Some performance characteristics of a Prussian Blue battery, Journal of Electrochemical Society, 132 (1985) 1382-1384.

[2] N. Imanishi, T. Morikawa, J. Kondo, Y. Takeda, O. Yamamoto, N. Kinugasa, T. Yamagishi, Lithium intercalation behavior into iron cyanide complex as positive electrode of lithium secondary battery, Journal of Power Sources, 79 (1999) 215-219.

[3] Y. Lu, L. Wang, J. Cheng, J. B. Goodenough, Prussian blue: a new framework for sodium batteries, Chemistry Communication, 48 (2012) 6544-6546.

[4] L. Wang, Y. Lu, J. Liu, M. Xu, J. Cheng, D. Zhang, J. B. Goodenough, A superior low-cost cathode for a Na-ion battery, Angew. Chem. Int. Ed., 52 (2013) 1964-1967.

[5] A. Eftekhari, Potassium secondary cell based on Prussian blue cathode, J. Power Sources, 126 (2004) 221-228.

[6] C. D. Wessells, R. A. Huggins, Y. Cui, Copper hexacyanoferrate battery electrodes with long cycle life and high power, Nature Communication, 2 (2011) 550.

[7] C. D. Wessells, S. V. Peddada, R. A. Huggins, Y. Cui, Nickel hexacyanoferrate nanoparticle electrodes for aqueous sodium and potassium ion batteries. Nano Letters, 11 (2011) 5421-5425.

[8] C. D. Wessells, S. V. Peddada, M. T. McDowell, R. A. Huggins, Y. Cui, The effect of insertion species on nanostructured open framework hexacyanoferrate battery electrode, J. Electrochem. Soc., 159 (2012) A98-A103.

[9] T. Matsuda, M. Takachi, Y. Moritomo, A sodium manganese ferrocyanide thin film for Na-ion batteries, Chemical Communications, DOI: 10.1039/C3CC38839E.

[10] S.-H. Yu, M. Shokouhimehr, T. Hyeon, Y.-E. Sung, Iron hexacyanoferrate nanoparticles as cathode materials for lithium and sodium rechargeable batteries, ECS Electrochemistry Letters, 2 (2013) A39-A41.

[11] D. Asakura, C, H. Li, Y. Mizuno, M. Okubo, H. Zhou, D. R. Tatham, Bimetallic cyanide-bridged coordination polymers as lithium ion cathode materials: core@shell nanoparticles with enhanced Cyclability, J. Am. Chem. Soc., 135 (2013) 2793-2799.

[12] M. Okubo, D. Asakura, Y. Mizuno, T. Kudo, H. Zhou, A. Okazawa, N. Kojima, K. Ikedo, T. Mizokawa, I. Honma, Ion-induced transformation of magnetism in a bimetallic CuFe Prussian blue analogue, Angew, Chem, Int. Ed., 50 (2011) 6269-6273.

[13] H. J. Buser, D. Schwarzenbach, W. Petter, A. Ludi, the crystal structure of Prussian blue: $Fe_4[Fe(CN)_6]_3 \cdot xH=O$, Inorganic Chemistry, 16 (1977) 2704-2710.

[14] F. Herren, P. Fischer, A. Ludi, W. Haig, Neutron diffraction study of Prussian blue, $Fe_4[Fe(CN)_6]_3 \cdot xH_2O$. Location of water molecules and long-range magnetic order, Inorg. Chem. 1980, 19, 956-959

[15] K.-S. Park, P. Xiao, S.-Y, Kim, A. Dylla, Y.-M. Choi, G. Henkelman, K. J. Stevenson, J. B. Goodenough, Enhanced charge-transfer kinetics by anion surface modification of $LiFePO_4$, Chem. Mater. 24 (2012) 3212-3218.

It would be advantageous if a TMHCF cathode could be treated or modified in such a manner as to support the lattice structure through multiple cycles of charge and discharge.

SUMMARY OF THE INVENTION

Disclosed herein is a process to treat the surfaces of transition metal hexacyanaferrate (TMHCF) cathodes with simple materials to help maintain the lattice structure, promoting higher capacities and extended life cycling. The treatments can be carried out on the TMHCF powder during fabrication, or on the finished electrodes. In one aspect, stable passivation layers are coated on the surfaces of the TMHCF powder or electrodes. The compounds may be, but are not limited to, oxides, salts, and polymers. For example, $Al_2O_3$, $ZrO_2$, $NaAlO_2$, $Na_4Fe(CN)_6$, $Na_3Fe(CN)_6$, polypyrrole, or polyaniline may be used. As an alternative to a coating material, the surfaces of the TMHCFs may be modified to form very stable structure, by reducing lattice defects and undercoordinated transition metal ions. For example, non-metal elements and organic groups, e.g., oxygen, nitrogen, sulfur, fluorine, chlorine, or iodine, may be introduced to the TMHCF surfaces. This surface modification stabilizes the surface structure of the TMHCFs and reduces the barrier for the charge transfer across the electrode/electrolyte interface.

Accordingly, a protected TMHCF battery cathode is presented. The TMHCF cathode is made from a metal current collector, with $A_xM_yFe_z(CN)_n \cdot mH_2O$ particles having a crystal lattice structure overlying the current collector. The A cations are either alkali or alkaline-earth cations, and M is a transition metal;

where x is in the range of 0 to 2;
where y is in the range of 0 to 2;
where z is in the range of 0.1 to 2;
where n is in the range of 1 to 6; and,
where m is in the range of 0 to 7.

The TMHCF cathode also includes a cathode passivation layer.

In one aspect the cathode passivation layer may be materials such as oxides, simple salts, carbonaceous materials, or polymers that form a film overlying the $A_xM_yFe_z(CN)_n \cdot mH_2O$ particles. In another aspect, the cathode passivation layer is a material such as oxygen, nitrogen, sulfur, fluorine, chlorine, or iodine that interacts with the $A_xM_yFe_z(CN)_n \cdot mH_2O$ particles, to cure defects in the $A_xM_yFe_z(CN)_n \cdot mH_2O$ crystal lattice structure.

A method is also presented for synthesizing a TMHCF battery material. Initially, the method synthesizes a $A_xM_yFe_z$ $(CN)_n \cdot mH_2O$ powder including particles having a crystal lattice structure. In one aspect the $A_xM_yFe_z(CN)_n \cdot mH_2O$ powder is mixed with a conducting carbon and an organic binder in an organic solution, creating a mixture. The mixture is formed on a metal current collector, creating a cathode, and then a cathode passivation layer, as described above, is formed overlying the cathode. The cathode passivation layer may be formed using one of the following processes, for example: physical vapor deposition (PVD), chemical vapor deposition (CVD), ball milling, atomic layer deposition (ALD), gas exposure, electrodeposition, sol-gel, or solution dip. As an alternative, the $A_xM_yFe_z(CN)_n \cdot mH_2O$ powder is treated with a passivation material, and the passivation-treated $A_xM_yFe_z(CN)_n \cdot mH_2O$ powder is mixed with the conducting carbon and organic binder in an organic solution.

Additional details of the above-described TMHCF cathode, the above-described fabrication processes, and a TMHCF battery with a protected cathode are presented below.

BRIEF DESCRIPTION OF THE DRAWINGS

FIG. 1 is a diagram depicting the crystal structure of a transition-metal hexacyanoferrate (TMHCF) in the form of $A_xM1M2(CN)_6$ (prior art).

FIG. 2A is a diagram depicting a protected TMHCF battery cathode, and FIG. 2B depicts $A_xM_yFe_z(CN)_n \cdot mH_2O$ particles in detail.

FIG. 5 is a partial cross-sectional view of a TMHCF battery with a protected cathode.

FIGS. 6A and 6B are graphs depicting the performance of a $Na_2MnFe(CN)_6$ electrode without a $SiO_2$ coating.

FIG. 10 is a flowchart illustrating a method for synthesizing a TMHCF battery material.

FIG. 11 is a flowchart illustrating another method for synthesizing a TMHCF battery material.

DETAILED DESCRIPTION

Figure 3:
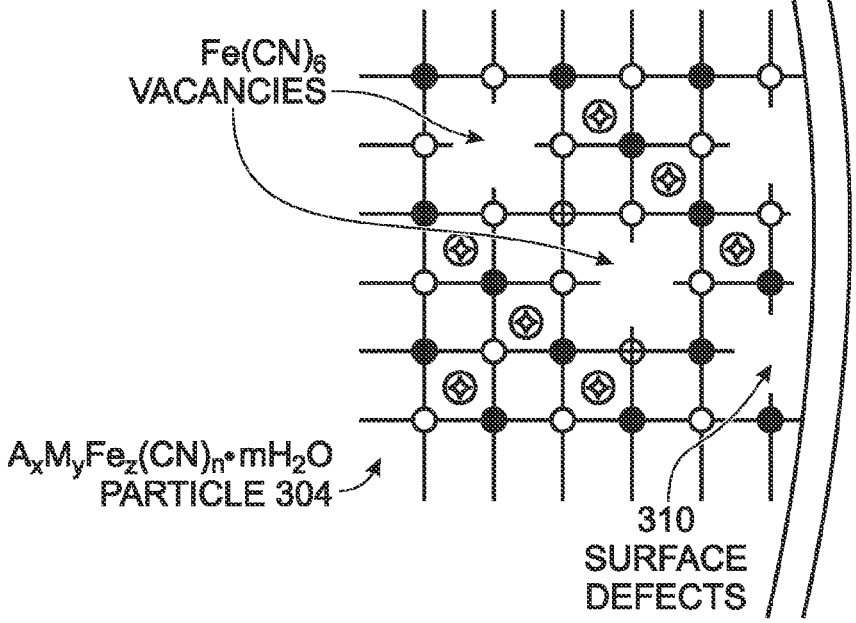
FIGS. 3 and 4 are detailed depictions representing the cathode passivation layer of FIGS. 2A and 2B.

FIG. 2A is a diagram depicting a protected TMHCF battery cathode, and FIG. 2B depicts $A_xM_yFe_z(CN)_n \cdot mH_2O$ particles in detail. The TMHCF battery cathode 300 comprises a metal current collector 302. $A_xM_yFe_z(CN)_n \cdot mH_2O$ particles 304 having a crystal lattice structure overlie the current collector 302. The A cations are either alkali or alkaline-earth cations (e.g., sodium (Na), potassium (K), calcium (CA), or magnesium (Mg)), and M is a transition metal:
where x is in the range of 0 to 2;
where y is in the range of 0 to 2;
where z is in the range of 0.1 to 2;
where n is in the range of 1 to 6;
where m is in the range of 0 to 7; and, The TMHCF cathode 300 further comprises a cathode passivation layer 306. As can be more clearly seen in FIG. 2B, the $A_xM_yFe_z(CN)_n \cdot mH_2O$ particles 304 are typically formed with a carbon black electronic conductor 308.

Figure 4:
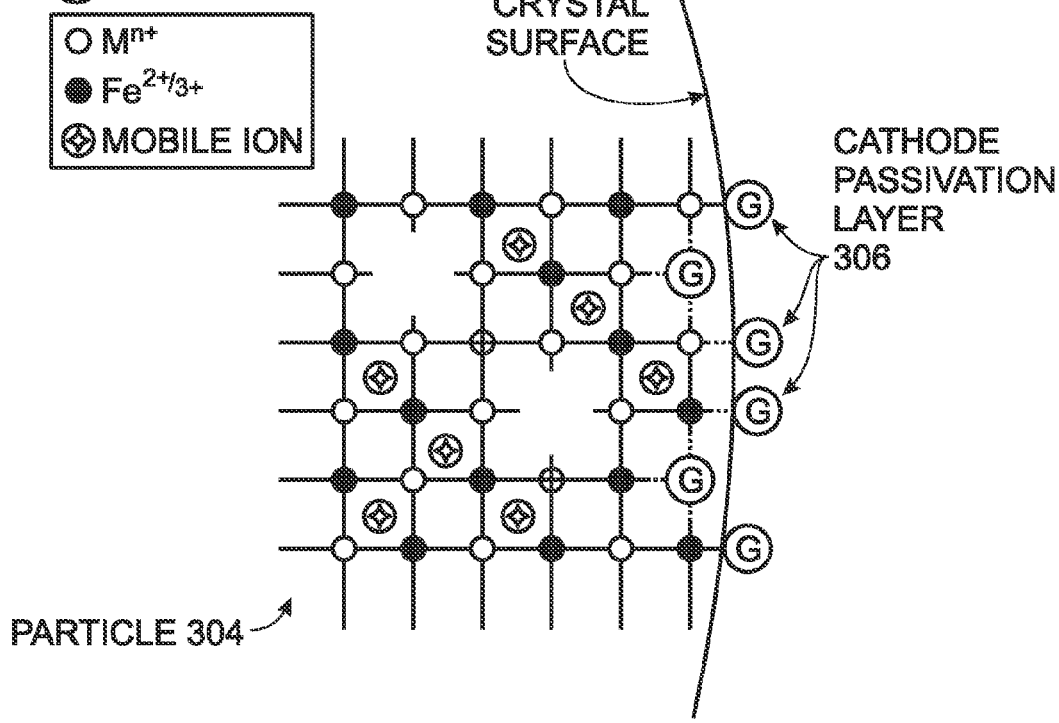

FIGS. 3 and 4 are detailed depictions representing the cathode passivation layer of FIGS. 2A and 2B. In FIG. 3 the cathode passivation layer 306 includes materials such as oxides, simple salts, carbonaceous materials, or polymers, and the cathode passivation layer 306 is a film overlying the $A_xM_yFe_z(CN)_n \cdot mH_2O$ particles 304. More explicitly, the cathode passivation layer materials may be aluminum oxide ($Al_2O_3$), magnesium oxide (MgO), silicon dioxide ($SiO_2$), zinc oxide (ZnO), lithium aluminum oxide ($LiAlO_2$), zirconium oxide ($ZrO_2$), sodium aluminum oxide ($NaAlO_2$), sodium ferricyanide ($Na_3Fe(CN)_6$), sodium ferrocyanide ($Na_4Fe(CN)_6$), potassium ferricyanide ($K_3Fe(CN)_6$), potassium ferrocyanide ($K_4Fe(CN)_6$), aluminum phosphate ($AlPO_4$), aluminum fluoride ($AlF_3$), polypyrrole, or polyaniline.

In FIG. 4 the cathode passivation layer 306 includes a material such as oxygen, nitrogen, sulfur, fluorine, chlorine, or iodine, and the cathode passivation layer 306 interacts with the $A_xM_yFe_z(CN)_n \cdot mH_2O$ particles 304, to cure defects 310 (shown in FIG. 3) in the $A_xM_yFe_z(CN)_n \cdot mH_2O$ crystal lattice structure. The cured defects are represented by the letter "G".

FIG. 5 is a partial cross-sectional view of a TMHCF battery with a protected cathode. The battery 500 comprises a cathode 300. As shown in FIG. 2A, the cathode 300 comprises a metal current collector 302 and $A_xM_yFe_z(CN)_n \cdot mH_2O$ particles having a crystal lattice structure overlying the current collector 302.

The A cations are either alkali or alkaline-earth cations, and M is a transition metal:
where x is in the range of 0 to 2;
where y is in the range of 0 to 2;
where z is in the range of 0.1 to 2;
where n is in the range of 1 to 6; and,
where m is in the range of 0 to 7.

The cathode 300 further comprises a cathode passivation layer 306.

Returning to FIG. 5, the battery 500 further comprises an anode 502 made from an A' metal, an A' metal containing composite, or a material that can host A' atoms, where the A' cations are either alkali or alkaline-earth cations. The battery 500 also comprises an electrolyte 504 filling unoccupied around each cathode 300 and anode 502, and a separator 506 between each anode 502 and cathode 300. In one aspect, the electrolyte 504 is an organic solvent containing A-atom salts, A'-atom salts, or a combination of A and A'-atom salts. In another aspect, A is Na, Ca, Mg, or K. Likewise, A' may be K, Ca, Mg, or Na.

Additional details of the cathode 300 have been presented above in the explanation of FIGS. 2A, 2B, 3, and 4, and are not repeated here in the interest of brevity.

When TMHCFs electrodes are used in rechargeable batteries, it is inevitable that they interact with electrolyte. During charge/discharge, ions must transfer between electrode and electrolyte to realize energy storage and conversion. In general, the surfaces of electrodes are different from their bulk form, and include many defects on the surfaces and have large surface area exhibiting high surface energy. The existence of defects makes the surfaces of conventional TMHCF electrodes readily degrade. During charge/discharge this degradation results in large capacity fading. High surface energy reduces energy barriers for many reactions and results in unpredictable side reactions. Ultimately, the surface defects cause unstable performance, low capacities, low coulombic efficiencies, and short cycling lives prevalent in conventional TMHCF electrodes.

To solve these problems, stable layers can be coated on the TMHCF electrodes. The layers may, for example, be comprised of oxides, simple salts and polymer that can be, but are not limited to, $Al_2O_3$, $MgO$, $ZnO$, $SiO_2$, $NaAlO_2$, $LiAlO_2$, $Na_4Fe(CN)_6$, $Na_2Fe(CN)_6$, polypyrrole, and polyaniline. These cathode passivation layers can: (1) sustain and stabilize the surfaces of TMHCFs; (2) prevent the TMHCFs from contacting electrolyte; (3) eliminate side reactions from occurring at the TMHCF surfaces; and, (4) improve the capacities and cycling lives of TMHCF electrodes.

The cathode passivation layers can be obtained by treating the TMHCFs powder during TMHCF powder fabrication, or by treating the TMHCF electrodes after TMHCF powder fabrication. To form cathode passivation layers on TMHCF powder, the powder may be dispersed into an aqueous or non-aqueous solution containing precursors for the surface layer coating. After reactions with the precursors, the TMHCF powder coating is formed. The thickness of the coating layers may be from 1 nanometer (nm) to 500 nm. For example, to obtain $NaAlO_2$-coated $Na_2MnFe(CN)_6$ powder, the synthesized $Na_2MnFe(CN)_6$ powder may be dispersed into a water solution containing $Al^{3+}$-ions. After strong stirring, $Al^{3+}$-ions are absorbed onto the surfaces of $Na_2MnFe(CN)_6$ powder. After a NaOH solution drip, $NaAlO_2$ gel forms on the surface of $Na_2MnFe(CN)_6$ powder. After washing and drying, the $NaAlO_2$-coated $Na_2MnFe(CN)_6$ powder is combined with binder and carbon black to make an electrode.

As an alternative to the solution method presented above, the layers can be coated on the TMHCF powder with a ball milling method, physical vapor deposition (PVD), or atomic layer deposition (ALD). For example, an $Al_2O_3$ layer can be formed on the surface of TMHCF powder using the ALD method.

The coating process can be also carried out after TMHCF electrode fabrication. The synthesized TMHCF powder is combined with a binder and conducting materials to make an electrode. The electrode can be a self-standing film or pasted on a current collector. Due to the porous structure of a TMHCF electrode, precursors for the surface layer coating can easily go inside of the electrodes. After reactions, the surface layer cover the electrode surface. The detailed processes are similar to those used to form layers on TMHCF powder. For example, a $SiO_2$ layer can be deposited on a $Na_2MnFe(CN)_6$ electrode using a PVD method. However, a solution-based atomic later deposition or solution-based deposition may be more effective for covering the electrode inner surfaces. Similar solution-based processes have been presented in the parent application entitled, CARBON-SULFUR COMPOSITE CATHODE PASSIVATION AND METHOD FOR MAKING SAME, invented by Jong-Jan Lee, Ser. No. 13/793,559, filed Mar. 11, 2013.

For example, a thin dielectric cathode passivation layer can be deposited by a liquid solution low-cost dip coating process. First, a metal alkoxide solution is prepared for use as a precursor. Then, the porous cathode is dipped in the metal alkoxide solution for a period of time (e.g. 30 seconds). Since the electrode is very porous, the solution wets the cathode electrode uniformly. However, no deposition occurs at this time. After taking the cathode electrode out of the metal alkoxide solution and dipping into water, the metal alkoxide undergoes hydrolysis and condensation processes (Equations, 1 and 2) and eventually an M-O-M compound is condensed and deposited uniformly inside the porous cathode. The condensation process in Equation 2 shows an oxo bridge (—)— formation. The processes continues, so that a -M-O-M-O-M- type linkage occurs. The thickness of the metal oxide layer depends on the precursor concentration. A thicker layer can be obtained with multiple layer depositions.

Hydrolysis

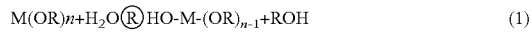

$$M(OR)n+H_2O \xrightarrow{R} HO-M-(OR)_{n-1}+ROH \quad (1)$$

Condensation

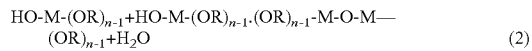

$$HO-M-(OR)_{n-1}+HO-M-(OR)_{n-1}.(OR)_{n-1}-M-O-M-(OR)_{n-1}+H_2O \quad (2)$$

R represents a proton or other ligand. If R is an alkyl, then OR is an alkoxy group and ROH is an alcohol.

After deposition, the film can be air dried, dried in a vacuum, or heated to ~100° C. in a vacuum. After drying, the deposited film is in an amorphous phase, and it is not necessary to crystallize the metal-oxide film. The film is permeable to an electrolyte, porous enough to permit ion diffusion ($Na^+$), but dense enough to block the dissolution of the metal cyanide anion.

Beside these processes, cathode passivation layers can be also formed on the electrode surfaces during charge/discharge cycles. Precursors are added to the electrode or electrolyte. During charge/discharge, the precursors decompose or react with the electrode to form layers on TMHCF electrodes. For example, $Na_4Fe(CN)_6$ may be added into $Na_2MnFe(CN)_6$ electrode and electrolyte. During charge/discharge, $Fe(CN)_6^{4-}$-ions capture $Mn^{2+}$-ions moving out from $Na_2MnFe(CN)_6$ electrode, which forms layers to coat the surface of the electrode. Further, the addition of $Fe(CN)_6^{4-}$-ions reduces the vacancies of $Fe(CN)_6$ on the TMHCF surfaces. The coated $Na_2MnFe(CN)_6$ cathode demonstrates higher capacity and better capacity retention than a pure $Na_2MnFe(CN)_6$ electrode.

As another alternative, either the TMHCF powder or electrodes can be heated in air to form layers of MOx and FeOy on their surface.

An example is presented herein of a $SiO_2$-coated $Na_2MnFe(CN)_6$ electrode. In this case, the $Na_2MnFe(CN)_6$ powder was mixed with carbon black and polytetrafluoroethylene (PTFE) to make self-standing electrodes for a sodium-ion battery. Silicon oxide layers with different thicknesses were deposited on the electrodes using a PVD technique.

Figure 6B:
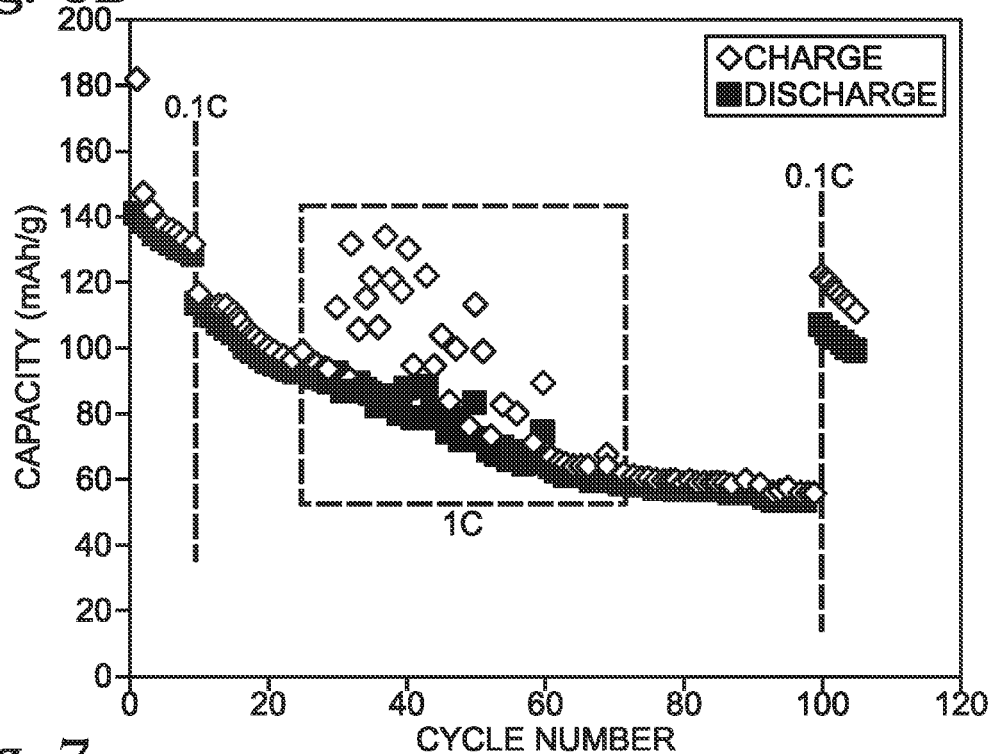

FIGS. 6A and 6B are graphs depicting the performance of a $Na_2MnFe(CN)_6$ electrode without a $SiO_2$ coating. As shown in FIG. 6A, when charged at high current levels, large voltage fluctuation appeared on the charge-time curves. The problem was attributed to sodium-dendrite formation. During the charge process, sodium-ions were electroplated on the sodium-metal anode. The sodium electroplating dendrites created a shortcut (leaking current) between the anode and cathode. In addition, the abnormal behavior took place just during the charge process. During discharge, the sodium dendrites dissolved into the organic electrolyte, and discharge capacity was normal with cycling as shown in FIG. 6B.

Figure 7:
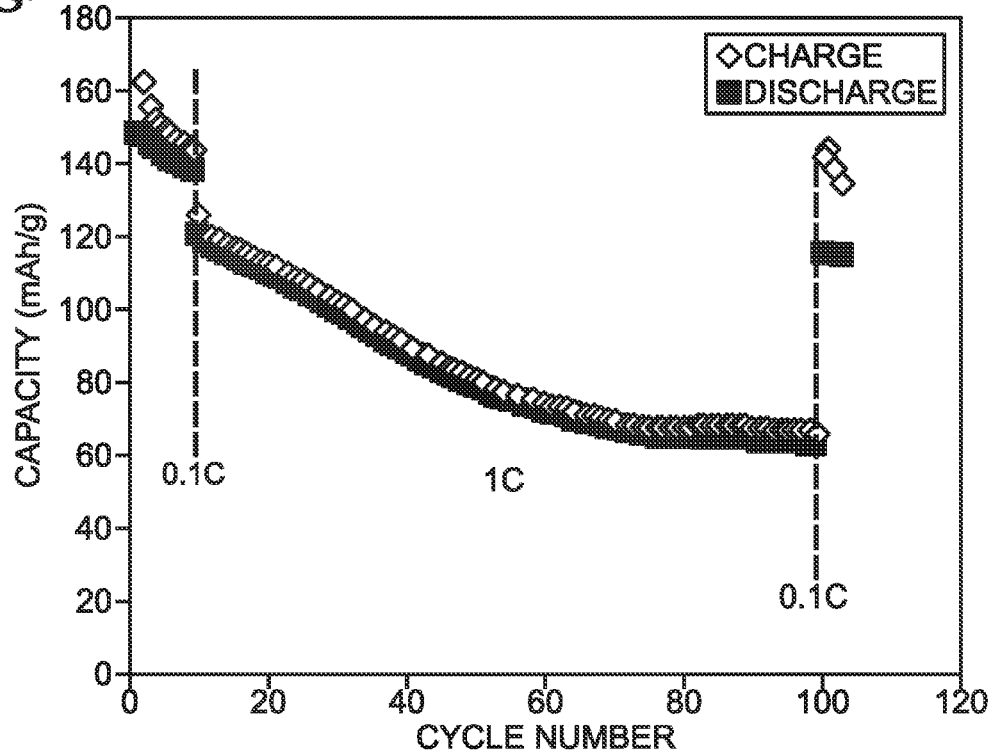
FIG. 7 is a graph depicting the performance of a $Na_2MnFe(CN)_6$ electrode with a $SiO_2$ coating.

FIG. 7 is a graph depicting the performance of a $Na_2MnFe(CN)_6$ electrode with a $SiO_2$ coating. After coating with a 100 Å $SiO_2$ layer, the $Na_2MnFe(CN)_6$ electrode was evaluated in a sodium-ion battery. FIG. 7 depicts charge capacity changes with cycling. Unlike the $Na_2MnFe(CN)_6$ electrode without $SiO_2$ coating (FIG. 8), the coated electrode demonstrated a stable performance at a high charge/discharge current. No abnormal charge capacity was observed on the electrode.

Figure 8:
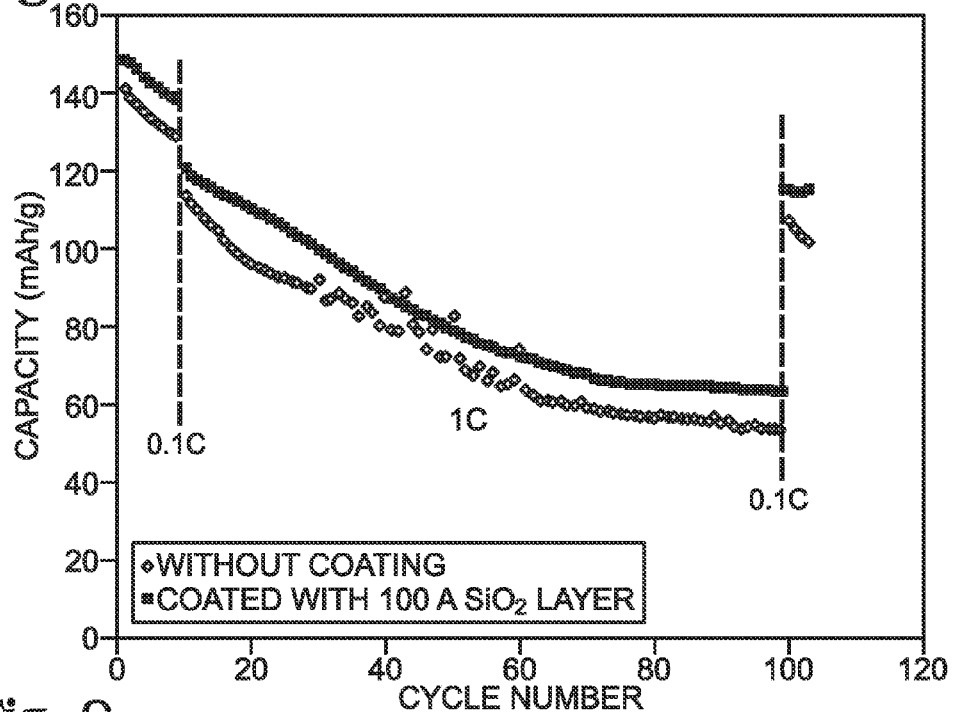
FIG. 8 is a graph comparing the effects of the $SiO_2$ layer on the capacity and capacity retention of a $Na_2MnFe(CN)_6$ electrode, with and without the $SiO_2$ layer.

FIG. 8 is a graph comparing the effects of the $SiO_2$ layer on the capacity and capacity retention of a $Na_2MnFe(CN)_6$ electrode, with and without the $SiO_2$ layer. During the first discharge, the $SiO_2$-coated $Na_2MnFe(CN)_6$ electrode delivered a capacity of 149 mAh/g that was 7 mAh/g higher than that of the $Na_2MnFe(CN)_6$ electrode without $SiO_2$ coating. At the $104^{th}$ cycle, the capacity of the $SiO_2$-coated $Na_2MnFe(CN)_6$ electrode was 115 mAh/g, and the capacity of the $Na_2MnFe(CN)_6$ electrode without $SiO_2$ coating was 102 mAh/g. The $SiO_2$ coating increased the capacity and capacity retention of $Na_2MnFe(CN)_6$ electrode. During the $SiO_2$-coating process, the $SiO_2$ vapor penetrated the surface of $Na_2MnFe(CN)_6$ electrode and modified the particle surface of $Na_2MnFe(CN)_6$ particles inside the electrode, which improved the electrode performance.

Besides coating the cathode with a protective film, the cathode passivation layer may act to modify the surface of a TMHCF electrode in a rechargeable battery. During the growth of TMHCF crystals, the $Fe(CN)_6$ positions cannot be totally occupied, creating vacancies. On the crystal surface, the case becomes more complicated. $Fe(CN)_6$ vacancies, transition metal ($M^{n+}$) defects, and undercoordinated metal ions appear on the surface. Vacancies and defects weaken the strength of the crystal structure near the surface. The extraction of mobile ions near the surface can reduce the strength even further. It is possible that the crystal structure may start to collapse from the surface. As an electrode in rechargeable batteries, conventional TMHCF cathodes demonstrate a rapid capacity fading because of their unstable surface. In addition, undercoordinated metal ions can impede the charge transfer between the electrode and electrolyte because undercoordinated metal ions with positive charges repulse the positive charged mobile ions approaching to the surface of the TMHCF electrode.

To solve these problems, the surface of TMHCF cathodes can be modified with non-metal elements and organic groups. The non-metal elements can be, but are not limited to, oxygen, nitrogen, sulfur, fluorine, chlorine, and iodine. These elements and organic groups interact with metal ions near surface to stabilize the structure of the TMHCF cathode. For example, these elements and organic groups go to vacancies near the surface to coordinate with metal ions, which supports and strengthens the framework of the TMHCF. The elements and organic groups also can connect with the undercoordinated metal ions on the surface to reduce their repulsion with mobile ions. The surface modification can be carried out with solutions or in gas environments.

An example is presented herein with oxygen modifying the surface of manganese HCF (Mn—HCF), $Na_2MnFe(CN)_6$. The Mn—HCF was heated in an oven with air/oxygen. After time, oxygen interacted with the metal ions on the Mn—HCF surface and formed Mn—HCF and Fe—O bonds. The bond formation stabilized the surface of Mn—HCF, which then showed a better capacity retention. The oxygen modification was carried out in a chamber typically used for PVD/CVD processes, with free oxygen radicals. Nitrogen and sulfur modification can be performed using similar methods with different element sources.

Before oxygen modifying, the particle size of the Mn—HCF was 50~100 nm, but the size increased to 150~200 nm after the oxygen modification. The structure of the two materials was investigated with X-ray diffraction (XRD). Their XRD patterns showed no difference, indicating that the oxygen modification occurred on the surface, forming a cathode passivation layer, and did not change the Mn—HCF structure.

Figure 9:
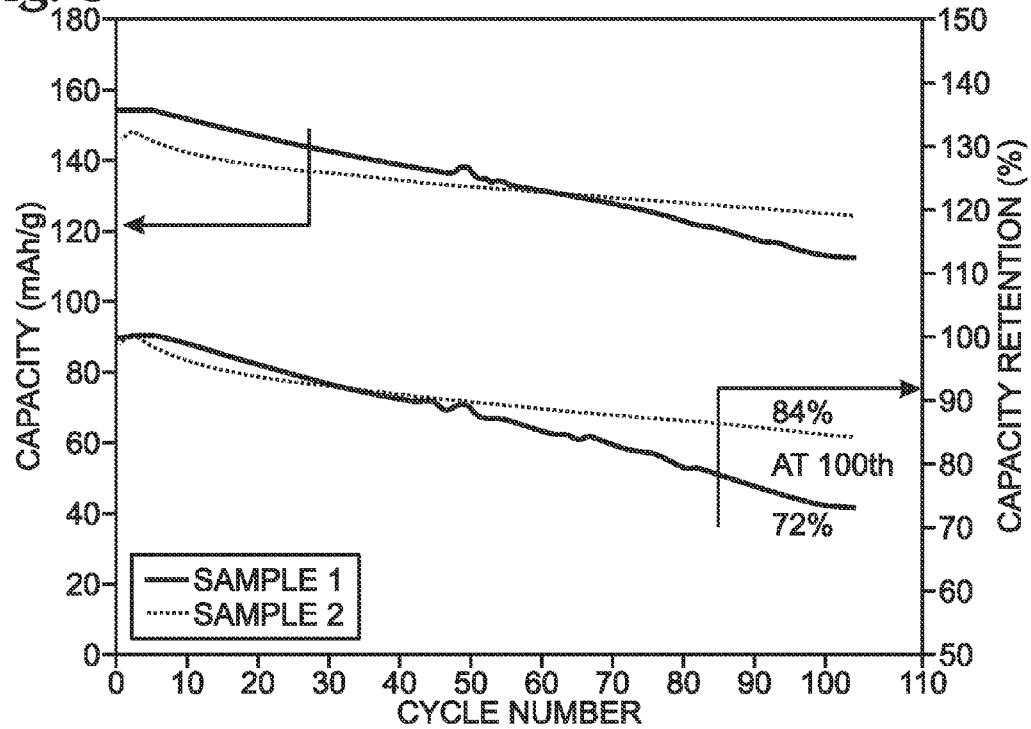
FIG. 9 is a graph comparing the performance of Mn—HCF, with and without cathode passivation layer oxygen modification.

FIG. 9 is a graph comparing the performance of Mn—HCF, with and without cathode passivation layer oxygen modification. The graph depicts the electrochemical behavior in cells with a counter electrode of sodium-metal. Saturated $NaClO_4$ ethylene carbonate (EC)/diethylene carbonate (DEC) was used as the electrolyte. The oxygen modification oxidized metal ions on the Mn—HCF surface, which reduced the sodium content in the Mn—HCF electrode because of the charge neutralization. So the capacity of Sample 2 (with the oxygen-modified cathode passivation layer) was smaller than that of Sample 1 (with no oxygen modification). However, it was observed that oxygen modification stabilized the surface structure of Mn—HCF and showed a better capacity retention. After 100 cycles, 84% capacity was left in the oxygen surface modified Mn—HCF, but only 72% capacity was remained in Mn—HCF without surface modification.

FIG. 10 is a flowchart illustrating a method for synthesizing a TMHCF battery material. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1000.

Step 1002 synthesizes a $A_xM_yFe_z(CN)_n \cdot mH_2O$ powder including particles having a crystal lattice structure. As noted above, the A cations may be alkali or alkaline-earth cations such as Na, Ca, Mg, or K. M is a transition metal, and:
 x is in the range of 0 to 2;
 y is in the range of 0 to 2;
 z is in the range of 0.1 to 2;
 n is in the range of 1 to 6; and,
 m is in the range of 0 to 7.

Step 1004 mixes the $A_xM_yFe_z(CN)_n \cdot mH_2O$ powder with a conducting carbon and an organic binder in an organic solution, creating a mixture. Step 1006 forms the mixture on a metal current collector, creating a cathode. Typically, the mixture is in the form of a paste that is pliable and easily dried. Step 1008 forms a cathode passivation layer overlying the cathode.

In one aspect, forming the cathode passivation layer in Step 1008 includes forming the cathode passivation layer with materials such as oxides, simple salts, carbonaceous materials, and polymers, so that the cathode passivation layer is formed as a film overlying the $A_xM_yFe_z(CN)_n \cdot mH_2O$ particles. More particularly, the cathode passivation layer may be a material such as aluminum oxide ($Al_2O_3$), magnesium oxide (MgO), silicon dioxide ($SiO_2$), zinc oxide (ZnO), lithium aluminum oxide ($LiAlO_2$), zirconium oxide ($ZrO_2$), sodium aluminum oxide ($NaAlO_2$), sodium ferricyanide ($Na_3Fe(CN)_6$), sodium ferrocyanide ($Na_4Fe(CN)_6$), potassium ferricyanide ($K_3Fe(CN)_6$), potassium ferrocyanide ($K_4Fe(CN)_6$), aluminum phosphate ($AlPO_4$), aluminum fluoride ($AlF_3$), polypyrrole, or polyaniline. However, this is not an exhaustive list of materials.

Step 1008 may form the cathode passivation layer using one of the following processes: PVD, CVD, ball milling, ALD, gas exposure, electrodeposition, sol-gel, or solution dip. In another aspect, Step 1008 may be performed with the following substeps. Step 1008a adds passivation precursors to an electrolyte. Step 1008b exposes the cathode to the electrolyte, and Step 1008c performs cycles of cathode charge and discharge.

In a different aspect, forming the cathode passivation layer in Step 1008 includes forming the cathode passivation layer with a material such as oxygen, nitrogen, sulfur, fluorine, chlorine, or iodine, so that the cathode passivation layer interacts with the $A_xM_yFe_z(CN)_n \cdot mH_2O$ particles, to cure defects in the $A_xM_yFe_z(CN)_n \cdot mH_2O$ crystal lattice structure.

FIG. 11 is a flowchart illustrating another method for synthesizing a TMHCF battery material. The method begins at Step 1100. Step 1102 synthesizes a $A_xM_yFe_z(CN)_n \cdot mH_2O$ powder including particles having a crystal lattice structure. The A cations may be alkali or alkaline-earth cations such as Na, Ca, Mg, or K. M is a transition metal, and:

x is in the range of 0 to 2;
y is in the range of 0 to 2;
z is in the range of 0.1 to 2;
n is in the range of 1 to 6; and,
m is in the range of 0 to 7.

Step 1104 treats the $A_xM_yFe_z(CN)_n \cdot mH_2O$ powder with a passivation material. Step 1106 mixes passivation-treated $A_xM_yFe_z(CN)_n \cdot mH_2O$ powder with a conducting carbon and an organic binder in an organic solution, creating a mixture. Step 1108 forms the mixture on a metal current collector, to create a protected cathode.

Treating the $A_xM_yFe_z(CN)_n \cdot mH_2O$ powder with the passivation material in Step 1104 may include using one of the following processes: PVD, CVD, ball milling, ALD, electrodeposition, sol-gel, gas exposure, or solution processing. With respect to the solution process method for treating the $A_xM_yFe_z(CN)_n \cdot mH_2O$ powder with the passivation material, the following substeps may be used. Step 1104a adds the $A_xM_yFe_z(CN)_n \cdot mH_2O$ powder to a solution including passivation precursors. For example, the solution may be an aqueous or non-aqueous solution. Step 1004b strongly stirs the solution. Step 1004c dries the solution to form a precipitate of passivation-treated $A_xM_yFe_z(CN)_n \cdot mH_2O$ powder.

In one aspect, Step 1004 treats the $A_xM_yFe_z(CN)_n \cdot mH_2O$ powder with passivation materials such as oxides, simple salts, carbonaceous materials, and polymers, wherein the passivation material forms a film overlying the $A_xM_yFe_z(CN)_n \cdot mH_2O$ particles. More particularly, these materials may be $Al_2O_3$, MgO, $SiO_2$, ZnO, $LiAlO_2$, $ZrO_2$, $NaAlO_2$, $Na_3Fe(CN)_6$, $Na_4Fe(CN)_6$, $K_3Fe(CN)_6$, $K_4Fe(CN)_6$, $AlPO_4$, $AlF_3$, polypyrrole, or polyaniline.

In another aspect, Step 1004 treats the $A_xM_yFe_z(CN)_n \cdot mH_2O$ powder with a passivation material such as oxygen, nitrogen, sulfur, fluorine, chlorine, or iodine, wherein the passivation material interacts with the $A_xM_yFe_z(CN)_n \cdot mH_2O$ particles, to cure defects in the $A_xM_yFe_z(CN)_n \cdot mH_2O$ crystal lattice structure.

A protected TMHCF cathode, a battery with a protected TMHCF cathode, and TMHCF fabrication processes have been provided. Examples of particular materials and process steps have been presented to illustrate the invention. However, the invention is not limited to merely these examples. Other variations and embodiments of the invention will occur to those skilled in the art.

We claim:

1. A protected transition metal hexacyanoferrate (TMHCF) battery cathode comprising:
    a metal current collector;
    $A_xM_yFe_z(CN)_n \cdot mH_2O$ particles having a crystal lattice structure overlying the current collector;
        where A cations are selected from a group consisting of alkali and alkaline-earth cations;
        where M is a transition metal;
        where x is in a range of 0 to 2;
        where y is in a range of 0 to 2;
        where z is in a range of 0.1 to 2;
        where n is in a range of 1 to 6;
        where m is in a range of 0 to 7; and,
    a cathode passivation layer including a material capable of interacting with the metal ions of the $A_xM_yFe_z(CN)_n \cdot mH_2O$ particles to cure vacancies in the crystal lattice structure.

2. The TMHCF battery cathode of claim wherein the cathode passivation layer includes materials selected from a group consisting of oxides, simple salts, carbonaceous materials, and polymers; and,
    wherein the cathode passivation layer is a film overlying the $A_xM_yFe_z(CN)_n \cdot mH_2O$ particles.

3. The TMHCF battery cathode of claim 2 wherein the cathode passivation layer includes a material selected from a group consisting of aluminum oxide ($Al_2O_3$), magnesium oxide (MgO), silicon dioxide ($SiO_2$), zinc oxide (ZnO), lithium aluminum oxide ($LiAlO_2$), zirconium oxide ($ZrO_2$), sodium aluminum oxide ($NaAlO_2$), sodium ferricyanide ($Na_3Fe(CN)_6$), sodium ferrocyanide ($Na_4Fe(CN)_6$), potassium ferricyanide ($K_3Fe(CN)_6$), potassium ferrocyanide ($K_4Fe(CN)_6$), aluminum phosphate ($AlPO_1$), aluminum fluoride ($AlF_3$), polypyrrole, and polyaniline.

4. The TMHCF battery cathode of claim 1 wherein the A cations are selected from a group consisting of sodium (Na), calcium (Ca), magnesium (Mg), and potassium (K).

5. The TMHCF battery cathode of claim 1 wherein the cathode passivation layer includes a material selected from a group consisting of oxygen, nitrogen, sulfur, fluorine, chlorine, and iodine.

6. A transition metal hexacyanoferrate (TMHCF) battery with a protected cathode, the battery comprising:
    a cathode comprising:
        a metal current collector;
        $A_xM_yFe_z(CN)_n \cdot mH_2O$ particles having a crystal lattice structure overlying the current collector;
            where A cations are selected from a group consisting of alkali and alkaline-earth cations;
            where M is a transition metal;
            where x is in a range of 0 to 2;
            where y is in a range of 0 to 2;
            where z is in a range of 0.1 to 2;
            where n is in a range of 1 to 6;
            where m is in a range of 0 to 7;
        a cathode passivation layer including a material capable of interacting with the metal ions of the $A_xM_yFe_z(CN)_n \cdot mH_2O$ particles to cure vacancies in the crystal lattice structure;
    an anode selected from a group consisting of an A' metal, an A' metal containing composite, and a material that can host A' atoms, where A' cations are selected from the group consisting of alkali and alkaline-earth cations; and,
    an electrolyte.

7. The TMHCF battery of claim 6 wherein the cathode passivation layer includes materials selected from a group consisting of oxides, simple salts, carbonaceous materials, and polymers; and,
    wherein the cathode passivation layer is a film overlying the $A_xM_yFe_z(CN)_n \cdot mH_2O$ particles.

8. The TMHCF battery of claim 7 wherein the cathode passivation layer includes a material selected from a group consisting of aluminum oxide ($Al_2O_3$), magnesium oxide (MgO), silicon dioxide ($SiO_2$), zinc oxide (ZnO), lithium aluminum oxide ($LiAlO_2$), zirconium oxide ($ZrO_2$), sodium aluminum oxide ($NaAlO_2$), sodium ferricyanide ($Na_3Fe(CN)_6$), sodium ferrocyanide ($Na_4Fe(CN)_6$), potassium ferricyanide ($K_3Fe(CN)_6$), potassium ferrocyanide ($K_4Fe(CM_6)$), aluminum phosphate ($AlPO_4$), aluminum fluoride ($AlF_3$), polypyrrole, and polyaniline.

9. The TMHCF battery of claim 6 wherein the electrolyte is an organic solvent containing a material selected from a group consisting of A-atom salts, A'-atom salts, and a combination of the above-mentioned salts.

10. The TMHCF battery of claim 6 wherein A is selected from a group consisting of sodium (Na), calcium (Ca), magnesium (Mg), and potassium (K); and,
wherein A' is selected from a group consisting of Na, Ca, Mg, and potassium K.

11. The TMHCF battery of claim 6 wherein the cathode passivation layer includes a material selected from a group consisting of oxygen, nitrogen, sulfur, fluorine, chlorine, and iodine.

* * * * *